United States Patent [19]
Cessou

[11] Patent Number: 5,447,370
[45] Date of Patent: Sep. 5, 1995

[54] DEVICE FOR REGULATING FLUCTUATIONS OF THE COMPOSITION OF A MULTIPHASE FLOW

[75] Inventor: Maurice Cessou, Saint Symphorien D'Ozon, France

[73] Assignee: Institut Francais du Petrole, Rueil Malmaison Cedex, France

[21] Appl. No.: 167,358

[22] Filed: Dec. 16, 1993

Related U.S. Application Data

[63] Continuation of Ser. No. 799,119, Nov. 27, 1991, abandoned.

[30] Foreign Application Priority Data

Nov. 27, 1990 [FR] France ................... 90 14917

[51] Int. Cl.6 .................................. B01F 5/00
[52] U.S. Cl. ................... 366/167.1; 366/101; 366/173.1; 366/184
[58] Field of Search .......... 55/190, 199; 261/122, 261/DIG. 75; 366/101–107, 136, 177, 191, 130, 167, 184

[56] References Cited

U.S. PATENT DOCUMENTS

| | | | |
|---|---|---|---|
| 1,651,866 | 12/1927 | Bowers | 366/191 |
| 2,301,203 | 11/1942 | Doane | 366/137 |
| 2,545,640 | 3/1951 | Aitken | 366/136 |
| 3,810,604 | 5/1974 | Reiter | 366/101 |
| 4,051,204 | 9/1977 | Muller | 366/101 |
| 4,678,646 | 7/1987 | Watanabe | 366/136 |
| 4,781,811 | 11/1988 | Mankut | 261/122.1 |
| 4,812,045 | 3/1989 | Rivers | 366/107 |
| 5,009,508 | 4/1991 | Wojdylo | 366/101 |

FOREIGN PATENT DOCUMENTS

| | | | |
|---|---|---|---|
| 2642539 | 8/1990 | France . | |
| 764148 | 12/1956 | United Kingdom | 366/137 |

*Primary Examiner*—David A. Scherbel
*Assistant Examiner*—Terrence R. Till
*Attorney, Agent, or Firm*—Antonelli, Terry, Stout & Kraus

[57] ABSTRACT

A device for regulating the fluctuations of a multi-phase flow having gas, fluid and solid components characterized in a vessel having a feed pipe and a draw-off tube disposed therein. The feed pipe being horizontally disposed and having a plurality of downwardly facing apertures to help suspend solids that have accumulated at the bottom of the vessel. The draw-off tube being vertically located within the vessel having a plurality of apertures all of which are disposed above the horizontal location of the feed pipe. The draw-off tube drawing off a mixture of gas and liquid. The vessel dampening the fluctuations of the multiphase mixture exiting the feed pipe.

9 Claims, 3 Drawing Sheets

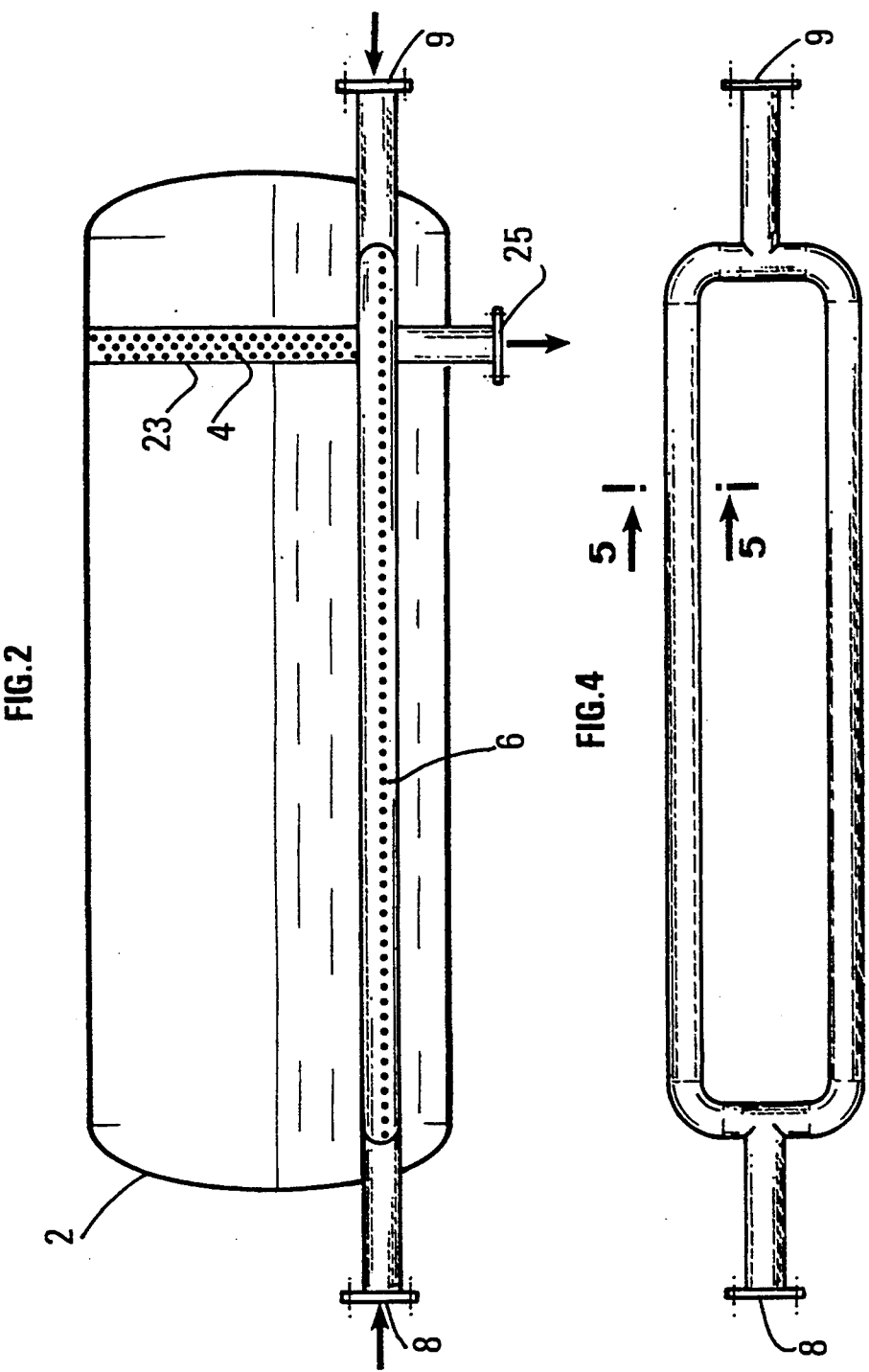

DEVICE FOR REGULATING FLUCTUATIONS OF THE COMPOSITION OF A MULTIPHASE FLOW

This application is a Continuation application of application Ser. No. 799,119, filed Nov. 27, 1991, now abandoned.

FIELD OF THE INVENTION

The present invention relates to an improvement of a device and its related method comprising a tank and means for introducing a multiphase effluent into this tank. The improvement of the invention makes it possible to render homogeneous the liquid phase contained in this tank.

BACKGROUND OF THE INVENTION

The present invention is particularly well-adapted to tanks used for damping the fluctuations of the composition of a multiphase flow, said tanks including a fluid or preferably liquid phase and one solid phase in the form of particles. The invention makes it possible to improve the suspension of solid particles in the fluid and preferably liquid phase.

The improvement of the invention may be advantageously applied to the patent EN 89/01.332 which describes a device for regulating and damping the fluctuations of the composition of a multiphase flow comprising at least one liquid phase and one gas phase.

This device comprises a phase separation tank, the tank comprises at least one opening for intake of the multiphase mixture, and means for drawing-off the contents of this tank.

Said drawing-off means extend inside the tank so as to pass through the gas-liquid interface during normal operation conditions and comprise drawing-off openings distributed on each side of the interface in normal operation, the sum of the flow sections of the openings being estimated from a reference position over at least a portion of a vertical axis varies as a function of the side considered on said axis and for said portion, said portion extending in normal operation on each side of said interface.

The drawing-off means may comprise at least one drawing-off tube and the drawing-off openings may be distributed over this tube.

The drawing-off tube may comprise at least one common outlet for the liquid phase and the gaseous phase.

The drawing-off tube may comprise at least two distinct outlets, one of said which draws off a liquid rich phase.

The drawing-off tube may comprise at least two separate outlets, one of which draws off a gas rich phase.

As has already been mentioned, the present invention makes it possible to improve the method and device described more particularly in the patent EN 89/01.332 so as to further improve the homogenizing of phases and to place and keep in suspension the particles in the effluent.

According to the prior Art, one of the major drawbacks concerning the functioning of the regulating tank and regulating reservoir is the formation of solid deposits due to the accumulation of particles at the bottom of the recipient, these deposits risking clogging the outlet orifices of the recipient and of modifying its volume.

It is then essential to carry out drainings which require that the device be halted and which are adapted to difficult operating conditions, such as those encountered at the water bottom in cases of sub-marine applications relating to the treatment of petroleum effluent, for example.

SUMMARY OF THE INVENTION

Accordingly, the present invention relates to a device for placing and keeping in suspension the particles of an effluent comprising one liquid phase and one gas phase, the liquid phase possibly containing solid particles. This device comprises a phase separation tank, the tank comprises means for drawing-off its contents and comprises at least one opening for intake of the effluent and injection means situated close to the bottom of the tank. The device is characterized in that said injection means comprise at least one orifice directed downwards. By means of this disposition of the orifices, the jets provoked by the flowing of the effluent through the orifices shall make it possible to take off the solids accumulated at the bottom of the tank after a stoppage period and to create upward currents keeping the solids in suspension when the device is in operation.

The injection means may be situated in the lower half of the tank.

The injection means may comprise at least one injection tube.

Said injection tube may comprise orifices distributed over its lower part and directed slanting downwards. So as to harmonize flows, the angle of the orifices with respect to vertical shall be between 0° and 90°. The optimal value of the angle shall be close to 45° C.

The operating optimization of such a device is linked to rendering uniform the flows created in the tank and thus to the selection of the number and size of the orifices situated over the injection tube, as well as their shape. This choice results in a compromise between the need to have good agitation in the recipient, in other words an upward speed greater than the speed for sedimenting the particles, and nevertheless without creating losses of excessive charges.

Said orifices shall preferably have a circular shape. Their diameter shall be between 5 and 20 mm so that they do not get clogged and ensure sound operation of the system. Their number and size depend on the speed desired. By way of example, for a 25000 BPD-GOR 10 pump (total flowrate 165 m 3/hr in induction conditions), a speed of 5 to 6 m/sec is obtained in a 4 inch pipeline. If it is desired to retain the same speed in the orifices, it is necessary to have 100 holes, diameter 10 mm, or 45 holes, diameter 15 mm.

The tube may comprise at least one opening for intake of the effluent.

The tube may comprise at least two separate openings for intake of the effluent.

The present invention also relates to the application of the above described device to the regulation and feed of a multiphase pump.

The present invention also relates to the application of the aforesaid device for improving the homogenization of the phases in the tank.

BRIEF DESCRIPTION OF THE DRAWINGS

The present invention will be better understood and its advantages will be clearer from the following description of particular embodiments, in no wise limitative, illustrated by the accompanying figures in which:

FIG. 2 represents another embodiment in which the injection means comprise two inlets.

FIGS. 3 and 4 represent two variants of the injection means.

DETAILED DESCRIPTION OF THE PREFERRED EMBODIMENTS

Figure 1:
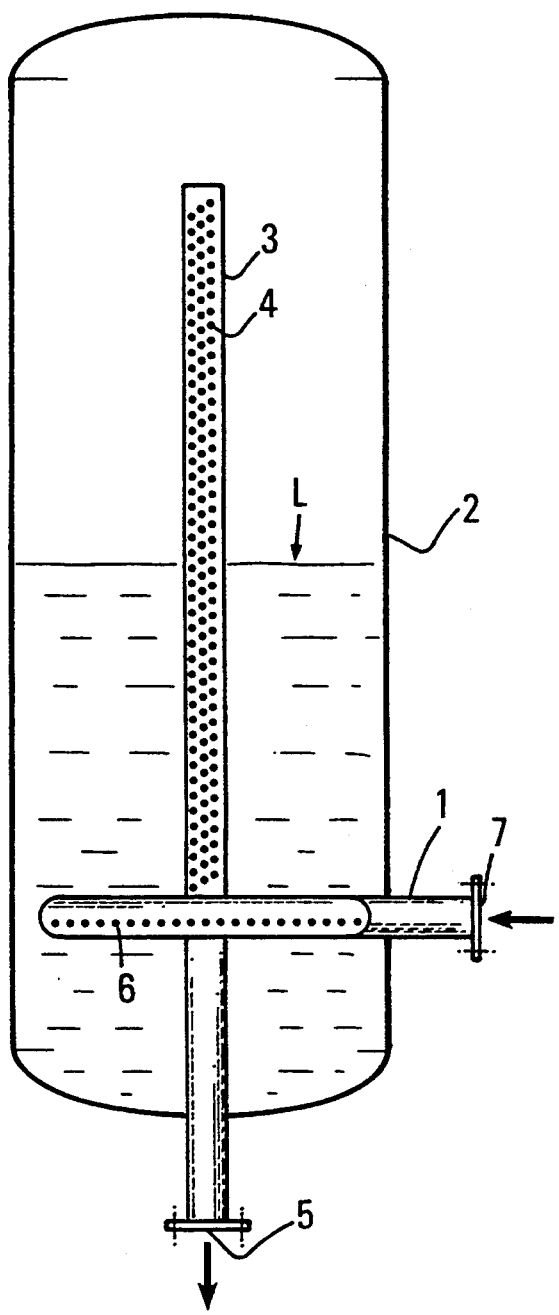
FIG. 1 shows a first embodiment with injection means having a single inlet.

On FIG. 1, the reference 1 designates the tube for injecting a multiphase mixture into a transfer tank 2. This tank comprises a drawing-off tube 3. This tube comprises holes 4 distributed over its length. The tube 3 is connected to an outlet tube 5 for conveying the multiphase mixture to its destination.

The injection tube is situated close to the lower half of the bottom of the tank and has the shape of a torus. It may be approximately horizontal with respect to the bottom of the tank. In addition, this tube comprises orifices 6 situated on its lower part and directed downwards and slanting on both sides of the vertical axis perpendicuar to the tube. This tube is connected to a tube 7 for admission of the multiphase mixture. The drawing-off tube 3 is encompassed by the injection tube.

Without departing from the context of the present invention, it is possible for the holes to be orientated towards the bottom of the tank and for their axes to be approximately vertical.

FIG. 2 represents another embodiment of the injection tube. The elements common to FIGS. 1 and 2 bear the same references. The injection tube is located close to the bottom of the tank at its lower half. It may be approximately horizontal with respect to the tank bottom.

The tank comprises a drawing-off tube 23 in which holes 24 are distributed over its length. The tube 23 is connected to an outlet tube 25 for conveying the multiphase mixture to its destination.

In this embodiment, said tube has the shape of a rectangle and has two inlets for admission of the multiphase mixture, one 9 being situated at the tank extremity close to the drawing-off tube, the other 8 being situated at the opposing tank extremity. The drawing-off tube is encompassed by the injection tube and comprises drawing-off holes. It is connected to an outlet tube 25 for conveying the multiphase mixture to its destination.

Figure 3:
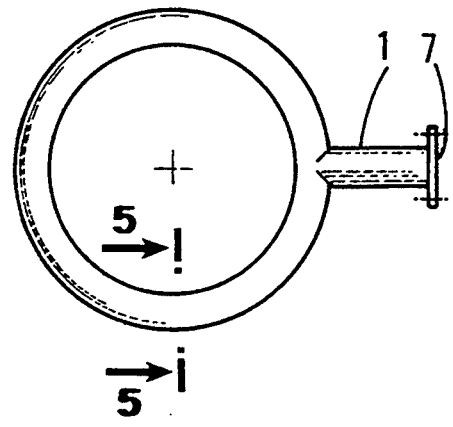

FIG. 3 shows in a developped way one embodiment of the injection tube having the shape of a torus.

FIG. 4 shows another embodiment of the injection tube whose shape is rectangular.

Figure 5:
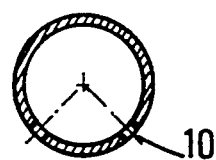
FIG. 5 shows a way to embody the injection orifices when the angle is optimal and 45° C.

FIG. 5 represents in a developped way of one embodiment of the injection tube in which circular orifices 10 have been made. It can be seen that, in this embodiment, the orifices are situated in the lower part of the tube on each side of the vertical axis perpendicular to the tube and directed downwards and slanting on each side of the vertical axis perpendicular to the tube with a preferred angle of 45° C.

Without departing from the context of the present invention, it is possible for the tube to comprise several rows of orifices disposed in zig-zag fashion.

Figure 6:
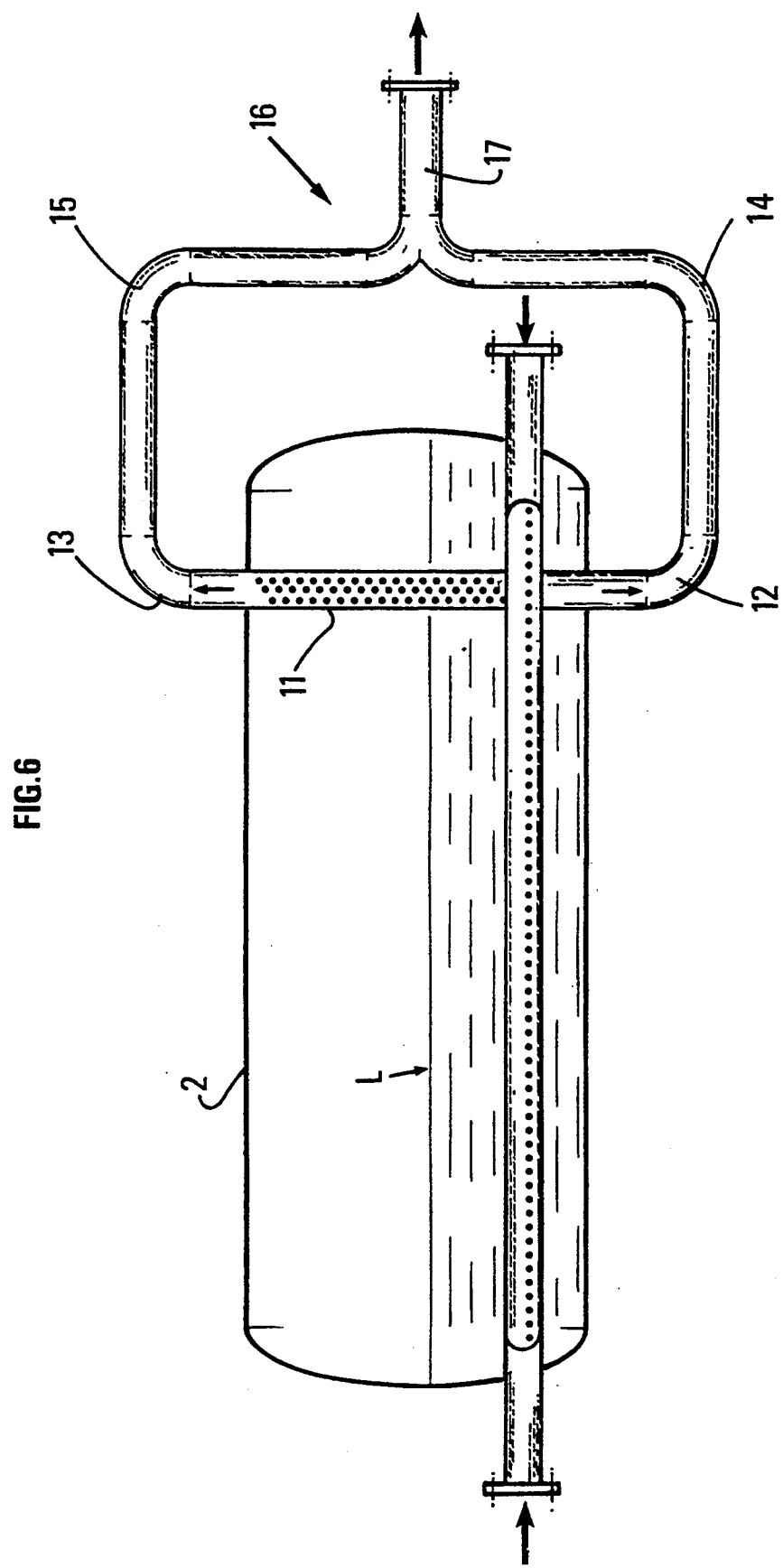
FIG. 6 shows one of the possible improvements due to an injection device applied to a tank comprising the drawing-off means having two outlets.

FIG. 6 represents another embodiment. The elements common to FIGS. 1 and 2 bear the same references. The drawing-off tube 11 passes heightwise from one side to the other of the tank and has two outlets, a low one 12 and a high one 13 connected respectively to a low transport tube 14 and a high transport tube 15. These tubes are joined together at 16 and the resultant mixture is transferred by the tube 17. The operation of the device according to the embodiments of FIGS. 1 and 2 is given below.

The low transport tube 14 transfers an essentially liquid effluent, whereas it is the essential gas effluent which is transported by the high transport tube 15.

The purpose of the multiphase regulating reservoir or tank 2 is to reduce the GOR variations which may be observed in an intermittent multiphase flow (flow with liquid plugs and gas pockets), to transform a plugged flow into a bubble flow (homogeneous flow), and to have a sufficient liquid reserve for removing a large amount of gas. By GOR is meant the ratio of the gas volume to the liquid volume (Gas Oil Ratio).

The tank is a piece of a static equipment which makes it possible to transform a GOR variation of the fluid at the inlet into a level variation in the tank, this variation of level possibly of low amplitude (case of a cylindrical tank with horizontal axis) or greater amplitude (case of a cylindrical tank with a vertical axis).

In addition, the amount of liquid retained in the tank may form a reserve which can be used for wetting a large dry gas pocket (several cubic meters) and removing it with a GOR making it possible to obtain a sufficient pressure gain with a multiphase pumping system. This tank may also serve for receiving, if a phase recycle is used, the liquid or gas phase extracted from the multiphase mixture at the outlet of the compression unit. In terms of a petroleum application, this tank may also serve for separating a part of the water contained in the petroleum effluent and for separating a part of the sand contained in the petroleum effluent.

This tank is equipped with an apertured tube for discharging the multiphase mixture.

Discharge of the multiphase fluid separated or partially separated in the tank takes place through the apertured tube 3 or 11, depending on whether the embodiment of FIG. 1 or 2 is considered, placed vertically in the tank. This tube makes it possible to discharge the liquid proportionally to the immersed flow section SL. Similarly, the gas is discharged proportionally to the non-immersed flow section SG.

If we call Pi the static pressure in the tank at the level of an orifice i of the apertured tube and Ps the pressure of the fluid at the outlet of the apertured tube, the outlet flowrates of the gas and of the liquid are given by the equationship:

$$Pi - Ps = f(Qi)$$

Qi: fluid flowrate passing through an orifice i.

The function f(Qi) takes into account the pressure loss through the orifice (or the pressure gain provided by the downward flow—ejector effect), the linear pressure loss in the tube, as well as the pressure losses due to the junctions (following orifices), Although the analytic expression of the function f(Qi) is not known, it can be readily imagined that the flow section (section of the orifices) required for removing a volume of liquid must be greater than the flow section required to remove a volume of gas. Thus, the hole density at the lower part of the apertured tube will be greater than at the upper part of this tube (except in the case of very high GOR or high pressure). The dimensioning of the outlet tube will be preferably provided so that the normal range of variation is situated in the middle of the tank.

Tests of the device of the invention have shown that it was possible to absorb sudden GOR variations which may occur at the outlet of a pipe and deliver a multiphase fluid whose mass per unit volume is practically constant and equal to the mean mass per unit volume of the fluid at the inlet of the tank (average over the period of time involved). In addition, this tank may form a reserve of liquid for removing, by the multiphase pump, a very large dry gas pocket (this gas pocket may appear during the start up phases of wells).

What is claimed is:

1. A device for regulating fluctuations in the composition of a flow of a multiphase mixture from a source to a point of destination, said multiphase mixture containing solid particles dispersed within at least one liquid phase and at least one gas phase, said device comprising a tank containing the multiphase mixture at a level providing an interface between a gas phase and a liquid phase, means for drawing off a multiphase mixture containing at least one liquid phase and at least one gas phase from said tank, means for introducing a flow of additional multiphase mixture into the tank including means for injecting the additional multiphase mixture into said tank below said interface in normal operation, said injection means comprising a plurality of injection orifices producing a plurality of jets directed into the liquid phase contained within the tank towards the bottom of the tank to create upward currents in the liquid phase and to provide uniform dispersion of the solid particles within the liquid phase during normal operation and said means for drawing off a continuous flow of the multiphase mixture from the tank comprising a tube extending inside the tank to pass through the gas-liquid interface during normal operation and having openings positioned on each side of the interface in normal operation; said openings in said tube distributed on each side of the interface being positioned above the injection means.

2. A device according to claim 1, wherein said injection means comprises a tubular means extending substantially horizontal in the liquid phase contained within said tank in normal operation, said tubular means being positioned above the bottom of the tank whereby solid particles will accumulate at the bottom of the tank below said injection means and the solid particles are removed after a stoppage upon resumption of normal operation.

3. A device according to claim 1, wherein said drawing-off means provides a flow of multiphase mixture of at least one liquid and at least one gas, which is homogenized by removing a portion of the gas phase above the interface and a portion of the liquid phase below the interface, and which contains the solid particles uniformly dispersed within the multiphase mixture.

4. A device according to claim 1, wherein said injection means comprises at least one injection tube and the injection orifices are distributed over the lower part of said tube.

5. A device according to claim 4, wherein said injection tube is arranged approximately horizontally within said tank and is situated in a lower half of the tank.

6. A device according to claim 4, wherein said injection orifices are directed downwardly and slanting on both sides of an axis perpendicular to the tube with an angle between 0° and 90°.

7. A device according to claim 4, wherein said orifices have a circular configuration.

8. A device according to claim 4, wherein said injection tube has the shape of a rectangle and said tank is arranged to extend horizontally.

9. A device according to claim 1, wherein said drawing-off tube has at least one common outlet for a liquid phase and for a gas phase.

* * * * *